United States Patent [19]

Panzarella

[11] E Patent Number: Re. 32,973

[45] Reissued Date of Patent: Jul. 4, 1989

[54] TOY BUBBLE-BLOWING LAWN MOWER

[75] Inventor: James S. Panzarella, North Kingstown, R.I.

[73] Assignee: The Quaker Oats Company, Chicago, Ill.

[21] Appl. No.: 53,152

[22] Filed: May 21, 1987

Related U.S. Patent Documents

Reissue of:

[64] Patent No.: 4,576,582
Issued: Mar. 18, 1986
Appl. No.: 695,177
Filed: Jan. 25, 1985

[51] Int. Cl.[4] ..... A63H 33/28
[52] U.S. Cl. ..... 446/16
[58] Field of Search ..... 446/16, 18, 21, 15

[56] References Cited

U.S. PATENT DOCUMENTS

| | | | |
|---|---|---|---|
| 1,031,764 | 7/1912 | Wright | 74/84 R |
| 2,579,714 | 12/1951 | Treuthart | 446/18 |
| 2,675,641 | 4/1954 | Boggott | 446/18 |
| 3,100,947 | 8/1963 | Hellman | 446/16 |
| 4,016,673 | 4/1977 | Constance | 446/18 |

FOREIGN PATENT DOCUMENTS

| | | | |
|---|---|---|---|
| 542579 | 6/1957 | Canada | 446/16 |

*Primary Examiner*—Mickey Yu
*Attorney, Agent, or Firm*—Cumpston & Shaw

[57] ABSTRACT

A toy bubble-blowing lawn mower is disclosed having a wheel driven impeller coupled to a propeller for generating a stream of air. The impeller is also intermittently coupled to a bubble disk in either direction of rotation of the impeller for successively moving apertures in the disk covered by a bubble-forming liquid film into alignment with the stream of air.

5 Claims, 2 Drawing Sheets

TOY BUBBLE-BLOWING LAWN MOWER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to toys, and more particularly to a toy bubble-blowing lawn mower.

2. Description of the Prior Art

It is known in the art to use bubble making apparatus in a toy as shown in Treuthart U.S. Pat. No. 2,579,714; Baggott U.S. Pat. No. 2,675,641; Ellman U.S. Pat. No. 3,008,263; Corbett U.S. Pat. No. 3,913,260; and Constance U.S. Pat. No. 4,016,673. The use of a turbine coupled to a rotating bubble, wheel is shown in Saachy U.S. Pat. No. 2,452,794; Bart U.S. Pat. No. 4,423,565; and Scott Canadian Pat. No. 487,368. A unidirectional gear drive for an impeller is shown in Hopkins U.S. Pat. No. 2,974,438. An intermittent motion mechanism is shown in Mehlfelder U.S. Pat. No. 1,225,151.

SUMMARY OF THE INVENTION

In accordance with a preferred embodiment of the invention, a toy bubble-blowing lawn mower is disclosed comprising a lawn mower body supported for back and forth movement of wheels. A propeller is mounted for rotation of the body, and is enclosed by a housing having a first opening through which a continuous stream of air is directed upon rotation of the propeller. A reservoir is formed in the body below the stream of air for receiving a bubble-forming liquid. A bubble disk is mounted on the body for rotation in a first plane normal to the stream of air with a portion of the disk immersed in the bubble-forming liquid. The disk further has a plurality of radially and equi-angularly spaced apertures adapted to pass through the liquid in succession upon rotation of the bubble disk to form liquid films across the apertures. An impeller having a cam is rotatably mounted on the body, and is coupled by means to the propeller for unidirectionally rotating the propeller during rotation of the impeller in either direction. The impeller is further coupled by means to one of the wheels such that rotation of the wheel is one direction rotates the impeller in one direction, and rotation of the wheel in the opposite direction rotates the impeller in the opposite direction. Means are also provided for intermittently coupling the impeller cam to the bubble disk for intermittently advancing the disk in one direction of rotation upon rotation of the impeller in one direction, and in the opposite direction of rotation upon rotation of the impeller in the opposite direction. The film covered apertures in the disk are intermittently and succesively positioned into alignment with a stream or air which blows the liquid film into bubbles.

In another aspect of the invention, the impeller has a gear and the propeller has a pinion. The means coupling the impeller to the propeller comprises a doublet gear moveable along an arcuate path. The doublet gear has a pinion in constant meshing engagement with the impeller gear, and a drive gear moveable into driving engagement with the propeller pinion upon rotational movement of the impeller in one direction, and out of driving engagement with the impeller gear upon rotational movement of the impeller in the opposite direction.

In a further aspect of the invention, the wheel is secured to a shaft. The means for coupling the wheel to the impeller comprises a pulley on the shaft, a pulley on the impeller, and a belt coupling the pulleys together.

In another aspect of the invention, the impeller is cylindrical and the impeller cam is V-shaped and mounted on the periphery of the impeller. The impeller has an annular peripheral ring in alignment with the apex of the cam. The ring has a notch in register with the impeller cam of a width substantially equal to the width of the cam. The bubble disk has a shaft at right angles to the impeller and substantially in alignment with the impeller cam. The shaft has a plurality of radially and angularly spaced, axially extending cam followers engageable in succession by the impeller cam upon rotation of the impeller in either direction of rotation.

In a more specific aspect of the invention, the lawn mower body has a spout connected to the reservoir through which a bubble-forming liquid can be poured into the reservoir. The body further has a second opening in alignment with the air emitting first opening and one of the disk apertures such that bubbles blown from the aperture are emitted through the second opening.

One of the primary advantages of this invention is to provide a toy bubble-blowing lawn mower that simulates to a certain degree a lawn mower of the type used by adults. The noise produced by the inertia propeller simulates a lawn mower internal combustion engine, and the emitted bubbles simulate the exhaust emission of the engine.

The invention and its advantages will become more apparent from the detailed description of the invention presented below.

BRIEF DESCRIPTION OF THE DRAWINGS

In the detailed description of the invention presented below, reference is made to the accompanying drawings, in which.

DETAILED DESCRIPTION OF THE INVENTION

Figure 1:
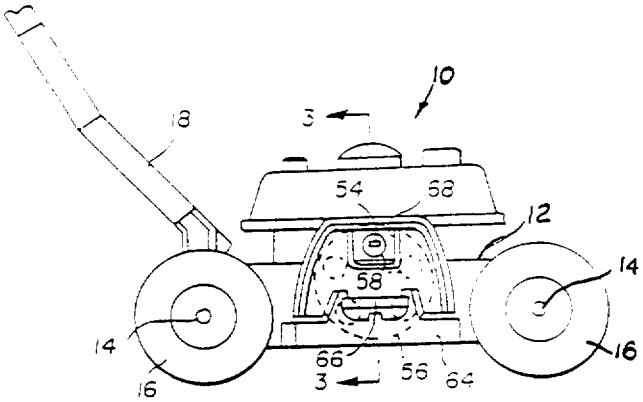
FIG. 1 is a side elevational view of the toy bubble-blowing lawn mower of this invention.

Referring now to FIG. 1 of the drawings, the toy bubble-blowing lawn mower 10 of this invention comprises a body 12 simulating a push-type lawn mower. The body 12 encloses a bubble-blowing mechanism, to be described hereinafter, and also rotatably supports a pair of axles 14 to which wheels 16 are rigidly secured. The toy lawn mower 10 further has a handle 18 pivotally secured to body 12 by which the lawn mower is pushed or pulled by a child.

Figure 2:
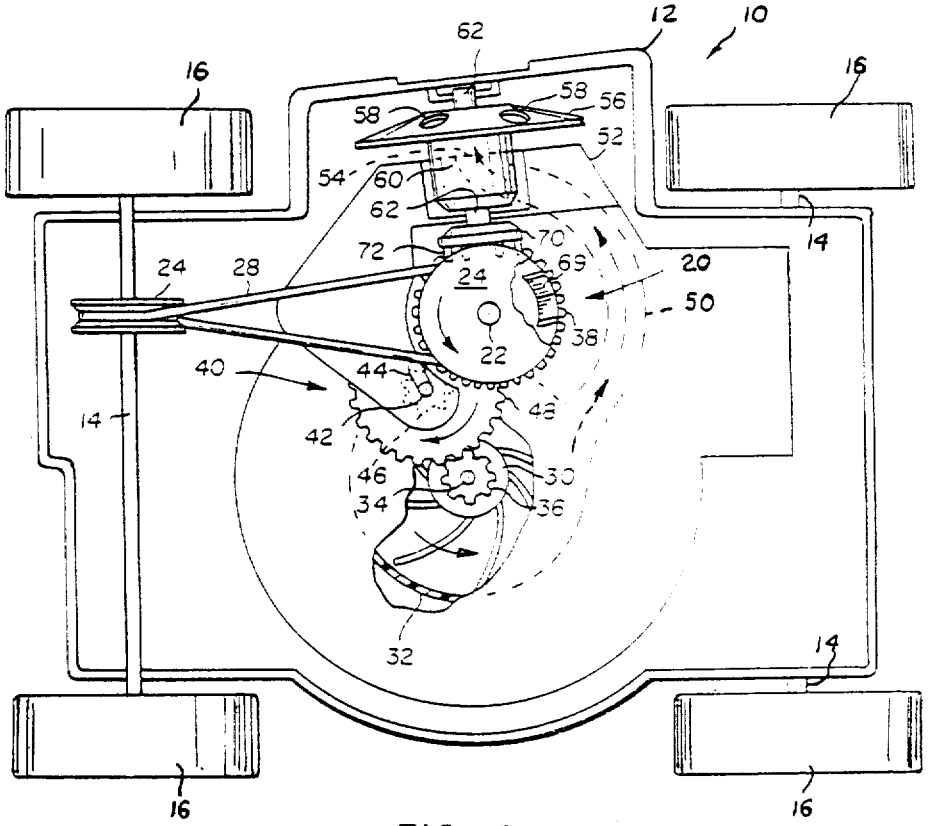
FIG. 2 is an enlarged, segmental bottom view of the toy lawn mower of FIG. 1 with the bottom body cover removed.
Figure 3:
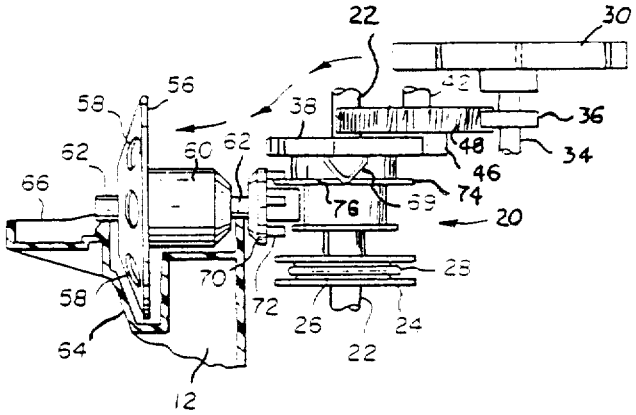
FIG. 3 is a partial section view taken substantially along line 3—3 of FIG. 1 with portions of the lawn mower omitted for purposes of clarity.

Referring to FIGS. 2 and 3, the bubble-blowing mechanism comprises a vertically oriented impeller 20 having a stub shafts 22 at the ends thereof journalled for rotation in top and bottom portions of body 12.

The means or mechanism for rotatably driving impeller 20 in either direction of rotation comprises a V-shaped pulley 24 secured to one of the axles 14, a V-shaped annular groove forming another pulley 26 adjacent one end of impeller 20, and an endless stretchable belt 28 of circular cross-section interconnecting the pulleys. Accordingly, back or forth movement of lawn mover 10 by a child rotates wheels 16 and axles 14 in one direction or the other. This, in turn, imparts rotational movement to impeller 20 in either direction of rotation.

The means for producing a continuous stream of air for bubble-blowing comprises a vaned propeller 30 rotatably mounted within a body housing 32 on a fixed vertical shaft 34, the ends of which are secured to body 12. The propeller 30 is unidirectionally driven by a gear train comprising a pinion 36 on shaft 34, a ring gear 38 on impeller 20, and a unitary doublet gear 40 interposed therebetween. The doublet gear 40 is vertically oriented and has stub shafts 42 and the ends thereof, only one of which is shown, moveable within grooves 44. The doublet gear 40 has a pinion 46 in constant meshing engagement with impeller gear 38, and a larger diameter coaxial gear 48 engageable with propeller pinion 36. Rotation of impeller 20 in one direction causes doublet gear 40 to move to a propeller-engaging position in which gear 48 meshes with propeller pinion 36 and drives propeller 30 in one direction of rotation. Rotation of impeller 20 in the opposite direction causes doublet gear 40 to move to a propeller-disengaged position in which gear 48 is disengaged from propeller pinion 36. Accordingly, propeller 30 is rotatably driven in one direction only, and is provided with sufficient weight to function as an inertia propeller so that it continues to rotate for a length of time after the drive force from impeller 20 is removed.

The propeller housing 32 has a peripheral opening 50 communicating with a passage in a manifold 52 mounted in body 12. The passage ends in an opening 54 through which a continuous stream of air is directed upon rotation of propeller 30.

Means are also provided for successively moving films of bubble-forming liquid into alignment with the stream of air to blow bubbles. The means comprises a disk-shaped bubble disk 56 having a plurality of radially and equi-angularly spaced apertures 58. The disk 56 has a large diameter integral central shaft 60 having axle portions 62 journaled for rotation in body 12.

The body also forms a semi-cylindrical reservoir 64 (FIG. 3) for receiving a bubble-forming liquid, not shown, into which a lower portion of disk 56 is immersed. Any suitable bubble-forming liquid, such as a soapy solution, for example, is introduced into reservoir 64 through a spout 66 formed by body 12, as best seen in FIG. 3. Upon rotation of disk 56, apertures 58 passing through the liquid are covered by a film of bubble-forming liquid. When each film covered aperture 58 is moved into alignment with the stream of air, bubbles are blown from the aperture and through an opening 68 (FIG. 1) in the body into the atmosphere.

The means for indexing bubble disks 56 in one direction or the other to position and hold an aperture 58 in alignment with the stream of air will now be described. The indexing means comprises a V-shaped cam 69 mounted on the periphery of impeller 38. An end of disk shaft 60 has a face plate 70 facing impeller 20 which is provided with four radially and equi-angularly spaced cam follower pins 72 axially extending toward impeller 20 in almost abutting relation. The pins 72 are arranged in relation to cam 69 such that upon each revolution of impeller 20, cam 69 engages a pin 72 and rotates it along with disk 56 a predetermined distance to place a succeeding film covered aperture 58 into alignment with the air stream. The disk 56 is held in the aligned position by an annular ring 74 on the impeller 20 substantially in alignment with the apex of cam 69. The ring 74 has a groove 76 in register with cam 69 and of substantially the same width as the cam to allow clearance room for a pin 72 as it is cammed through its predetermined angle. Following the camming action, ring 74 is in abutting relation with oppositely disposed pin 72 to prevent further rotation of the pins and disk 56 until the next camming action.

In operation of the invention, movement of the toy lawn mower 10 in a forward direction causes rear wheels 16 to drive impeller 20 which, in turn, drives propeller 30 for generating a stream of air. Rotation of impeller 20 also causes cam 69 to index cam follower pins 72 and bubble disk 56 through a predetermined angle once for each revolution of impeller 20 to position the next succeeding film covered aperture 58 in alignment with the air stream. As this occurs, the air stream blows the film to form bubbles which are blown through body opening 68.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A [toy] bubble-blowing [lawn mower] toy comprising in combination:

a [lawn mower] body;

wheels rotatably mounted on said body to support said body for back and forth movement;

a propeller mounted for rotation on said body;

a housing on said body enclosing said propeller, said housing having a first opening through which a continuous stream of air is directed upon rotation of said propeller;

a reservoir formed in said body below the stream of air for receiving a bubble-forming liquid;

a bubble disk mounted on said body for rotation in a first plane normal to the stream of air with a portion of said disk immersed in the bubble-forming liquid in said reservoir, said disk having a plurality of radially and equi-angularly spaced apertures adapted to pass through the liquid in succession upon rotation of said bubble disk to form liquid films across said apertures;

an impeller mounted for rotation on said body, said impeller having a cam;

means coupling said impeller to said propeller for unidirectionally rotating said propeller [during rotation of said impeller in either direction];

means coupling at least one of said wheels to said impeller for rotating said impeller upon rotational movement of said wheel; and means intermittently coupling said impeller cam to said bubble disk for advancing said bubble disk upon rotation of said impeller to successively position film covered apertures into alignment with the stream of air which blows the liquid films into bubbles.

2. The bubble-blowing [lawn mower] *toy* according to claim 1 wherein said impeller has a gear, said propeller has a pinion, and said means coupling said impeller to said propeller comprises an arcuately moveable doublet gear having a pinion in constant meshing engagement with said impeller gear and a drive gear moveable into driving engagement with said propeller pinion upon rotational movement of said impeller in one direction, and out of driving engagement with said impeller gear upon rotational movement of said impeller in the opposite direction.

3. The bubble-blowing [lawn mower] *toy* according to claim 2 wherein said wheel is secured to a shaft, and said means coupling said one wheel to said impeller comprises a pulley on said shaft, a pulley on said impeller, and a belt coupling said pulleys together.

4. The bubble-blowing [lawn mower] *toy* according to claim 3 wherein said impeller is cylindrical and said impeller cam is V-shaped and mounted on the periphery of said impeller, said impeller further having an annular peripheral ring in alignment with the apex of said impeller cam, said ring having a notch in register with said impeller cam and of a width subtantially equal to the width of said impeller cam, said bubble disk has a shaft at right angles to said impeller and substantially in alignment with said impeller cam, and a plurality of radially and equi-angularly spaced, axially extending cam follower pins at one end of said shaft engageable in succession by said impeller cam upon rotation of said impeller in either direction of rotation.

5. The bubble-blowing [lawn mower] *toy* according to claim 4 wherein said body has a spout connected to said reservoir through which a bubble-forming liquid can be poured into said reservoir, said body further having a second opening in alignment with said first opening and one of said apertures such that a bubble blown from said aperture is emitted through said second opening.

* * * * *